(12) United States Patent
Sano

(10) Patent No.: US 7,371,081 B2
(45) Date of Patent: May 13, 2008

(54) MOTOR DRIVER

(75) Inventor: Masafuyu Sano, Okazaki (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/806,139

(22) Filed: May 30, 2007

(65) Prior Publication Data

US 2007/0281511 A1 Dec. 6, 2007

(30) Foreign Application Priority Data

Jun. 5, 2006 (JP) .............................. 2006-156688

(51) Int. Cl.
*H01R 12/00* (2006.01)
(52) U.S. Cl. ..................... 439/76.2; 439/949
(58) Field of Classification Search ............... 439/65, 439/69, 74, 76.2, 620.27, 949
See application file for complete search history.

(56) References Cited

U.S. PATENT DOCUMENTS 7,247,031 B2 * 7/2007 Naito et al. ................ 439/76.2
7,249,956 B2 * 7/2007 Ishiguro et al. ............ 439/76.2
7,267,556 B2 * 9/2007 Oka et al. .................. 439/76.2
2007/0178723 A1 * 8/2007 Kataoka et al. ............ 439/76.2

FOREIGN PATENT DOCUMENTS

| JP | 2001-309524 | 11/2001 |
|---|---|---|
| JP | 2006-037837 | 2/2006 |

* cited by examiner

*Primary Examiner*—Khiem Nguyen
(74) *Attorney, Agent, or Firm*—Nixon & Vanderhye P.C.

(57) ABSTRACT

In a motor driver of a valve timing adjusting apparatus, each terminal at a first end side of a first circuit board is arranged after a corresponding terminal at a first end side of a second circuit board in a predetermined direction, which is generally perpendicular to a plane of each circuit board. Furthermore, each terminal at a second end side of the first circuit board is arranged after a corresponding terminal at a second end side of the second circuit board in the predetermined direction.

4 Claims, 4 Drawing Sheets

[removed]

MOTOR DRIVER

CROSS REFERENCE TO RELATED APPLICATION

This application is based on and incorporates herein by reference Japanese Patent Application No. 2006-156688 filed on Jun. 5, 2006.

BACKGROUND OF THE INVENTION

1. Field of the Invention

The present invention relates to a motor driver that drives an electric motor of a valve timing adjusting apparatus of an internal combustion engine to adjust valve timing of at least one of an intake air valve and an exhaust valve of the engine.

2. Description of Related Art

It is often difficult to have a sufficient installation space for installing a valve timing adjusting apparatus at an internal combustion engine. In order to address the above difficulty, it has been proposed to divide and install electrical circuit elements (components) of a motor driver of the valve timing adjusting apparatus to multiple circuit boards, which are then stacked one after another. In this way, an available installation area for installing the electrical circuit elements is increased, and installability of the motor driver is improved. Japanese Unexamined Patent Publication No. 2006-37837 discloses one such technique, in which the electrical circuit elements of the motor driver are divided between a first circuit board and a second circuit board, which are then stacked one after another. Here, terminals of the first circuit board are welded to terminals of the second circuit board at opposed ends of the circuit boards to electrically connect the electrical circuit elements of the first circuit board to the electrical circuit elements of the second circuit board and also to achieve a sufficient fixing strength of each circuit board.

However, in the above technique disclosed in Japanese Unexamined Patent Publication No. 2006-37837, a positional relationship of each terminal at a first end side of the first circuit board with respect to the corresponding terminal at a first end side of the second circuit board differs from a positional relationship of each terminal at a second end side of the second circuit board with respect to the corresponding terminal at a second end side of the second circuit board. More specifically, each terminal at the first end side of the first circuit board and the corresponding terminal at the first end side of the second circuit board are arranged in this order in a predetermined direction, which is generally parallel to a plane of each circuit board, and each terminal at the second end side of the second circuit board and the corresponding terminal at the second end side of first circuit board are arranged in this order in the predetermined direction. Therefore, when each terminal at the first end side of the first circuit board is moved toward and is welded to the corresponding terminal at the first end side of the second circuit board, each terminal at the second end side of the first circuit board may possibly be spaced from the corresponding terminal at the second end side of the second circuit board to leave a substantial gap therebetween due to, for example, a manufacturing tolerance. In such a case, in order to weld each corresponding terminal at the second end side of the first circuit board to the corresponding terminal at the second end side of the second circuit board, at least one of these terminals needs to be deformed by applying a load thereto. This will possibly result in initial deformation of the terminal(s), which will then possibly result in ripping-off of the welded joint between the terminals after long term use.

SUMMARY OF THE INVENTION

The present invention is made in view of the above disadvantages. According to one aspect of the present invention, there is provided a motor driver for a valve timing adjusting apparatus of an internal combustion engine, which has an electric motor to adjust valve timing of at least one of an intake air valve and an exhaust valve of the engine. The motor driver includes first and second circuit boards that drive the electric motor by supplying a drive electric current to the electric motor. The first and second circuit boards are arranged one after another in a specific direction that is generally perpendicular to a plane of the first circuit board and a plane of the second circuit board. The first circuit board includes a first side terminal and a second side terminal, which are spaced from each other in a predetermined direction that is generally parallel with the plane of the first circuit board and the plane of the second circuit board. The second circuit board includes a first side terminal and a second side terminal, which are separated from each other in the predetermined direction and which are connected to the first side terminal and the second side terminal, respectively, of the first circuit board. The first side terminal of the first circuit board is arranged after the first side terminal of the second circuit board in the predetermined direction. The second side terminal of the first circuit board is arranged after the second side terminal of the second circuit board in the predetermined direction.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
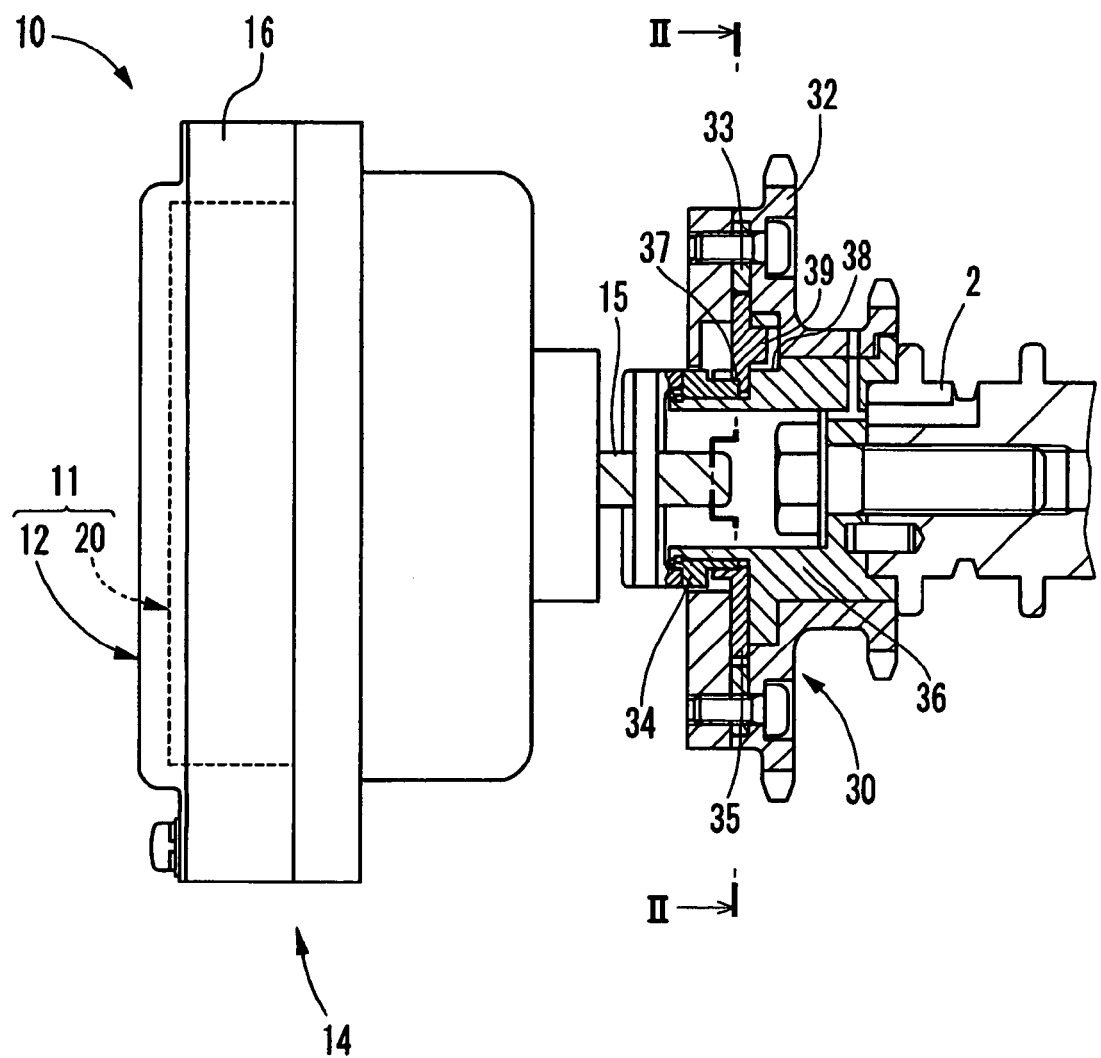
FIG. 1 is a partial cross sectional view showing a valve timing adjusting apparatus according to an embodiment of the present invention.

An Embodiment of the present invention will be described with reference to the accompanying drawings. FIG. 1 shows a valve timing adjusting apparatus 10 according to an embodiment of the present invention. The valve timing adjusting apparatus 10 adjusts valve timing of an intake air valve(s) or of an exhaust valve(s) through use of a rotational torque of an electric motor 12.

First, an electrical system 11 of the valve timing adjusting apparatus 10 will be described. The electrical system 11 includes an electric motor 12 and a motor driver 20.

The electric motor 12 is, for example, a brushless motor and includes a case 14, a motor shaft 15 and a coil (not shown). The case 14 is fixed to an internal combustion engine through a stay (not shown). The case 14 supports the motor shaft 15 in a rotatable manner in a forward rotational direction and a backward rotational direction and securely holds the coil. When the coil is energized to generate a rotational magnetic field in a clockwise direction in FIG. 2, a rotational torque in the forward rotational direction is applied to the motor shaft 15. In contrast, when the coil is energized to generate a rotational magnetic field in a counterclockwise direction in FIG. 2, a rotational torque in the backward rotational direction is applied to the motor shaft 15.

Figure 3:
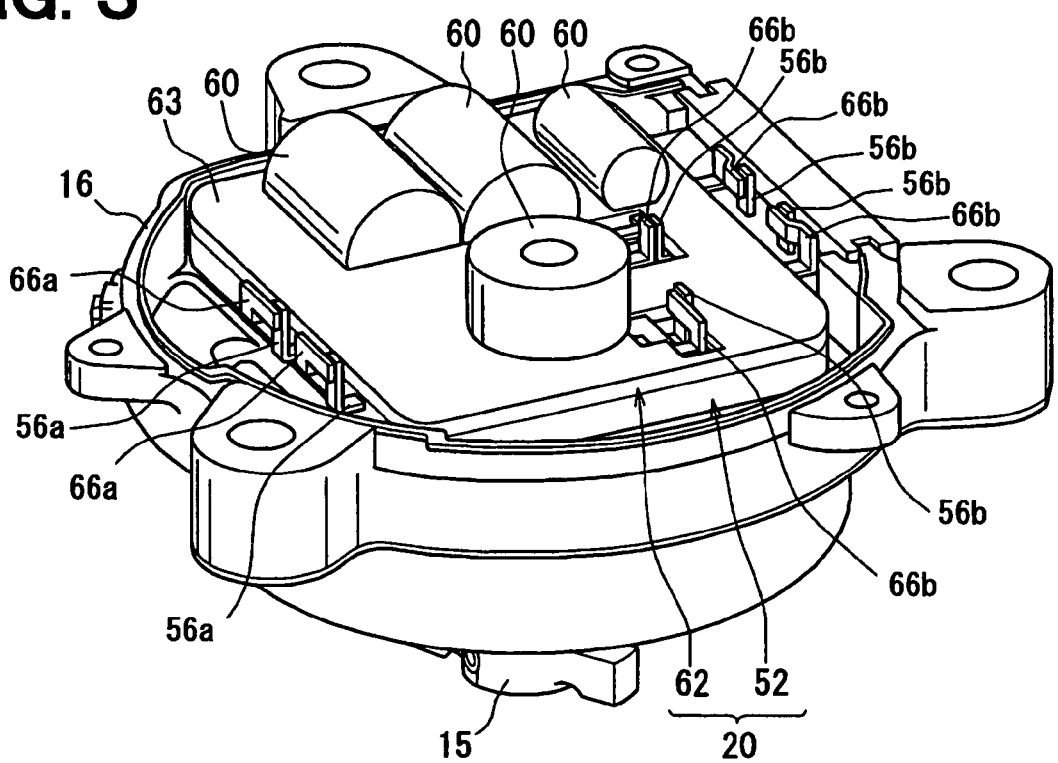
FIG. 3 is a perspective view showing an electrical system of the valve timing adjusting apparatus of the embodiment.

As shown in FIG. 3, the motor driver 20 is received and is fixed in a case member 16 of the case 14. The motor driver 20 is electrically connected to the electric motor 12 to drive the motor shaft 15 by energizing the coil.

Figure 2:
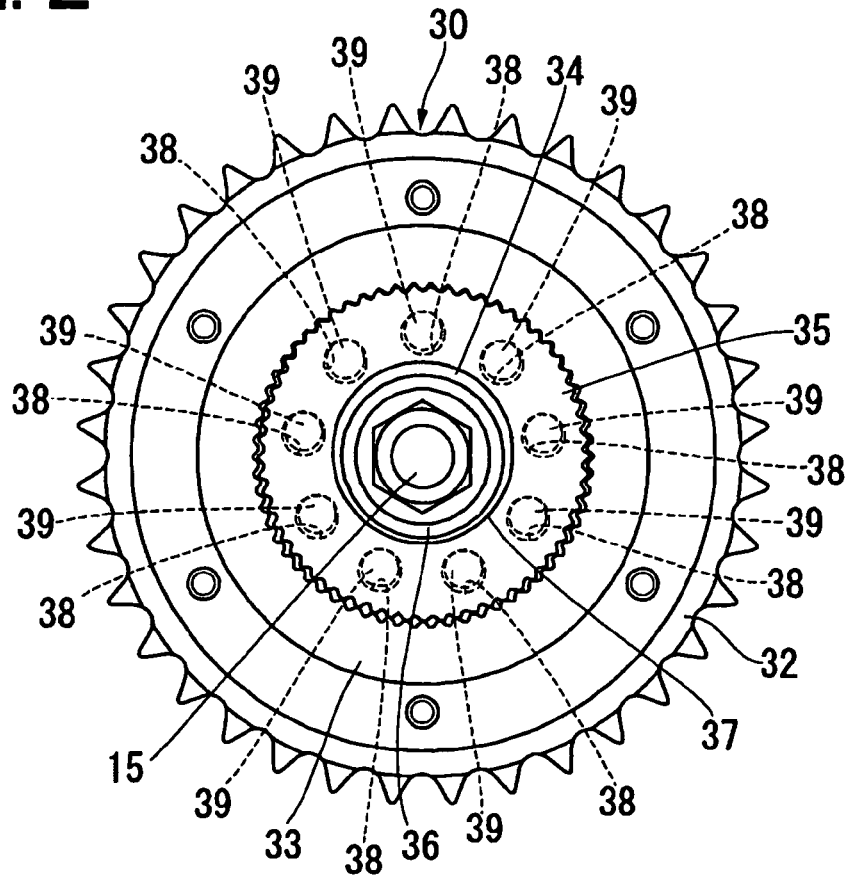
FIG. 2 is a cross sectional view along line II-II in FIG. 1.

Next, a phase change mechanism 30 of the valve timing adjusting apparatus 10 will be described. The phase change mechanism 30 is driven by the rotational torque of the electric motor 12 and includes a sprocket 32, a sun gear 33, a planetary carrier 34, a planetary gear 35 and an output shaft 36, as shown in FIGS. 1 and 2. In FIG. 2, a cross sectional hatching is eliminated for the sake of simplicity.

The sprocket 32 is arranged coaxially with the camshaft 2 and the motor shaft 15. When the drive torque is supplied from a crankshaft (not shown) of the engine to the sprocket 32, the sprocket 32 is rotated in the clockwise direction in FIG. 2 while maintaining its relative rotational phase with respect to the crankshaft. The sun gear 33 is fixed to an inner peripheral part of the sprocket 32 in a coaxial manner and rotates integrally with the sprocket 32.

As shown in FIGS. 1 and 2, the planetary carrier 34 is securely connected to the motor shaft 15, so that the planetary carrier 34 rotates integrally with the motor shaft 15. Furthermore, the planetary carrier 34 can rotate relative to the sprocket 32.

A cylindrical outer peripheral portion of the planetary carrier 34 forms an eccentric portion 37, which is eccentric to the sprocket 32. The planetary gear 35 is fitted to an outer peripheral surface of the eccentric portion 37, so that the planetary gear 35 is eccentric to the sun gear 33. The planetary gear 35 is meshed with the sun gear 33, and thereby the planetary gear 35 rotates about an eccentric axis of the eccentric portion 37 and revolves in the rotational direction of the planetary carrier 34 to implement the planetary movement.

The output shaft 36 is fixed coaxially to the camshaft 2 with a bolt. Thus, the output shaft 36 can rotate integrally with the camshaft 2 and can rotate relative to the sprocket 32. A plurality of engaging holes 38 is formed in the output shaft 36 in such a manner that the engaging holes 38 are arranged one after another at equal intervals in the rotational direction. A plurality of engaging projections 39 is formed in the planetary gear 35 in such a manner that the engaging projections 39 protrude into the engaging holes 38, respectively. The rotational movement of the planetary gear 35 is converted into the rotational movement of the output shaft 36 through the engagement of the engaging projections 39 with the engaging holes 38.

When the planetary carrier 34 does not rotate relative to the sprocket 32, the planetary gear 35 does not make the planetary movement and rotates integrally with the sprocket 32. Therefore, the output shaft 36 rotates integrally with the sprocket 32 while maintaining the relative phase with respect to the sprocket 32. When the planetary carrier 34 is rotated in the counterclockwise direction relative to the sprocket 32 in FIG. 2 due to, for example, an increase in the rotational torque in the backward rotational direction, the output shaft 36 is rotated in the clockwise direction relative to the sprocket 32 in FIG. 2 through the planetary movement of the planetary gear 35. Thus, the valve timing is advanced. In contrast, when the planetary carrier 34 is rotated in the clockwise direction relative to the sprocket 32 in FIG. 2 due to, for example, an increase in the rotational torque in the forward rotational direction, the output shaft 36 is rotated in the counterclockwise direction relative to the sprocket 32 in FIG. 2 through the planetary movement of the planetary gear 35. Thus, the valve timing is retarded.

Figure 4:
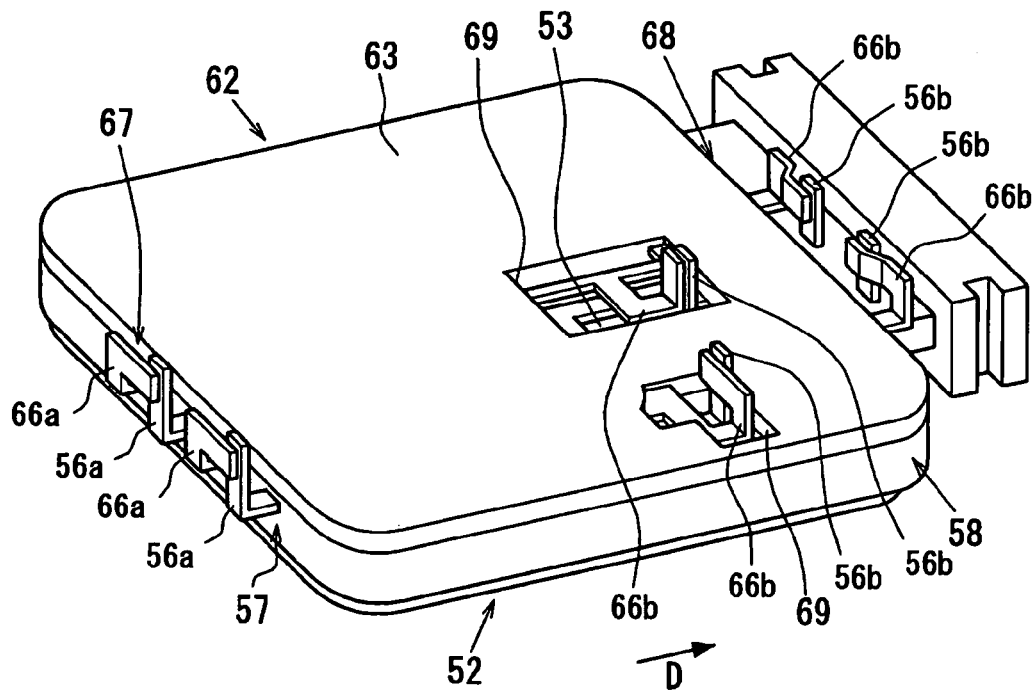
FIG. 4 is a perspective view showing a motor driver of the valve timing adjusting apparatus of the embodiment.
Figure 5:
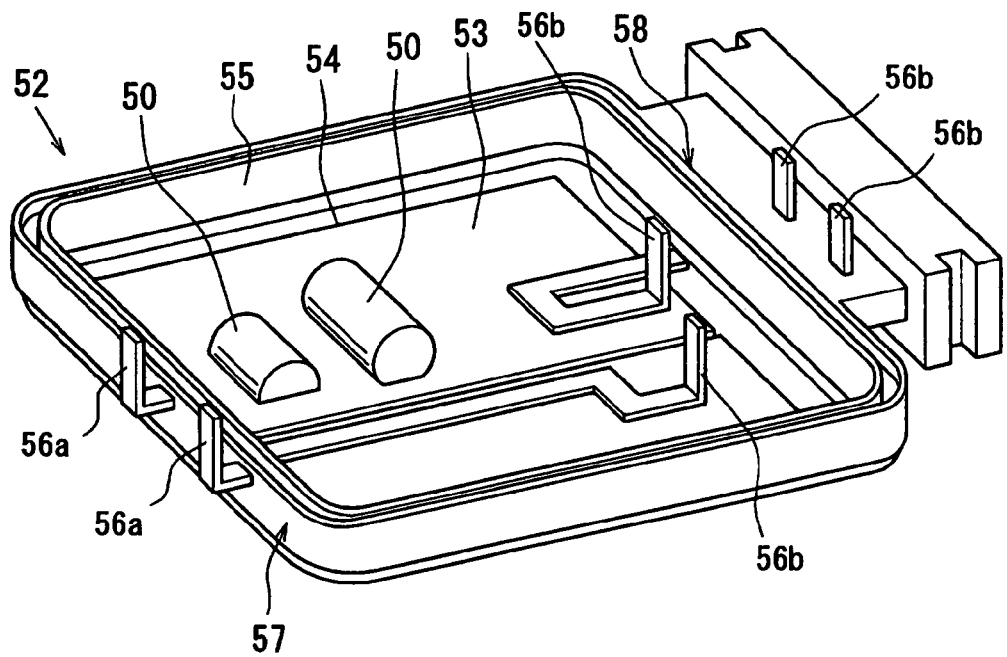
FIG. 5 is a perspective view of a first circuit board of the motor driver of FIG. 4.

Next, details of the motor driver 20 will be described. As shown in FIGS. 3 to 5, the motor driver 20 includes first and second circuit boards 52, 62. The first circuit board 52 has electrical circuit elements (devices for driving the motor) 50, and the second circuit board 62 has electrical circuit elements (devices for driving the motor) 60. The first and second circuit boards 52, 62 are stacked i.e., are arranged one after another in a specific direction, which is generally perpendicular to a plane of a circuit board surface 53, 63 of each of the first and second circuit boards 52, 62 (or simply referred to as a plane of each circuit board 52, 62).

The first circuit board 52 includes a circuit board main body 54 and a support wall 55, which are securely bonded to the case member 16. Terminals 56a, 56b are partially embedded in the support wall 55. The circuit board main body 54 is made of a ceramic material and is formed into a generally planar rectangular plate body. As shown in FIGS. 4 and 5, the electrical circuit elements 50 are installed to the circuit board surface 53 of the circuit board main body 54. The support wall 55 is made of a resin material and is formed into a generally rectangular frame body that extends along outer peripheral edges of the circuit board main body 54. The terminals 56a, 56b are partially embedded into the support wall 55 through insert molding. Each terminal 56a, 56b is made of a metal material, and the total number of the terminals 56a, 56b is six in this instance. Specifically, among the six terminals 56a, 56b, two terminals (first side terminals) 56a are arranged at a first end 57 side (a left end side in FIG. 5), and four terminals (second side terminals) 56b are arranged at a second end 58 side (a right end side in FIG. 5), which is opposite from the first end 57 side along an imaginary straight line that is generally parallel to the plane of the circuit board surface 53 of the first circuit board 52. The two terminals 56a at the first end 57 side project outwardly from the support wall 55 along the imaginary straight line, which is generally parallel to the plane of the circuit board surface 53, and are bent toward the second circuit board 62 side in a perpendicular direction, which is generally perpendicular to the plane of the circuit board surface 53. Two of the four terminals 56b, which are provided at the second end 58 side, project inwardly from the support wall 55 along the imaginary straight line, which is generally parallel to the plane of the circuit board surface 53, and these two terminals 56b are then bent toward the second circuit board 62 side in the perpendicular direction, which is generally perpendicular to the plane of the circuit board surface 53. Remaining two of the four terminals 56b, which are provided at the second end 58 side, are bent in the support wall 55 toward the second circuit board 62 side in the perpendicular direction, which is generally perpendicular to the plane of the circuit board surface 53.

Figure 6:
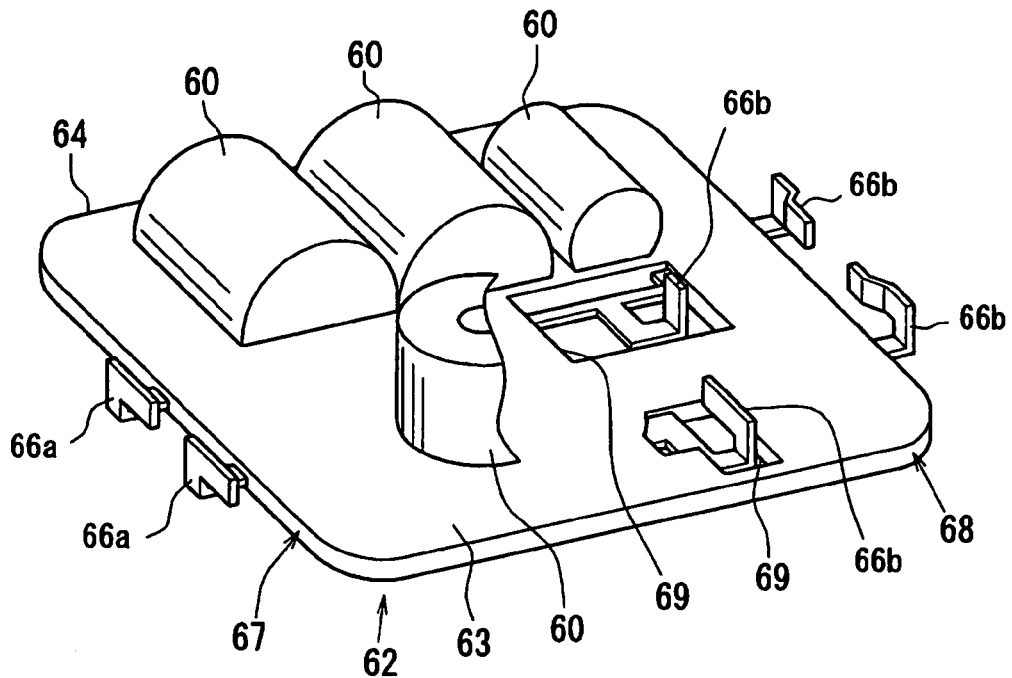
FIG. 6 is a perspective view of a second circuit board of the motor driver of FIG. 4.

As shown in FIGS. 4 and 6, the second circuit board 62 includes a circuit board main body 64, into which terminals 66a, 66b are partially embedded. The circuit board main body 64 is made of a resin material and is formed into a generally rectangular planar body. Outer peripheral edges of the circuit board main body 64 are supported by the support wall 55 of the first circuit board 52. The remaining electrical elements 60 are installed to the circuit board surface 63 of the circuit board main body 64. The terminals 66a, 66b are partially embedded in the circuit board main body 64 through insert molding. Each terminal 66a, 66b is made of the metal material, and the total number of the terminals 66a, 66b is six in this instance. These terminals 66a, 66b are arranged to correspond with the terminals 56a, 56b, respectively. Specifically, among the six terminals 66a, 66b, two terminals (first side terminals) 66a are arranged at a first end 67 side (a left end side in FIG. 6), and four terminals (second side terminals) 66b are arranged at a second end 68 side (a right end side in FIG. 6), which is opposite from the first end 67 side along the imaginary straight line that is generally parallel to the plane of the circuit board surface 63 of the second circuit board 62. The two terminals 66a at the first end 67 side project outwardly from the circuit board main body 64 along the imaginary straight line, which is generally parallel to the plane of the circuit board surface 63, and are bent away from the first circuit board 52 in the perpendicular direction, which is perpendicular to the plane of the circuit board surface 63. Two of the four terminals 66b, which are provided at the second end 68 side, project inwardly along the imaginary straight line, which is generally parallel to the plane of the circuit board surface 63, from the circuit board main body 64 into two through holes 69, respectively, of the circuit board main body 64, and these two terminals 66b are then bent away from the first circuit board 52 in the perpendicular direction, which is generally perpendicular to the plane of the circuit board surface 63. The remaining two of the four terminals 66b, which are provided at the second end 68 side, project outwardly from the circuit board main body 64 along the imaginary straight line, which is generally parallel to the plane of the circuit board surface 63, and are then bent away from the first circuit board 52 in the perpendicular direction, which is generally perpendicular to the plane of the circuit board surface 63.

As shown in FIG. 4, each of the two terminals 66a at the first end 67 side of the second circuit board 62 is welded to a corresponding adjacent one of the two terminals 56a at the first end 57 side of the first circuit board 52 on the outer side (the left side in FIG. 4) of the corresponding terminal 56a along the imaginary straight line, which is generally parallel to the plane of each circuit board surface 53, 63. Also, each of the four terminals 66b at the second end 68 side of the second circuit board 62 is welded to a corresponding adjacent one of the four terminals 56b at the second end 58 side of the first circuit board 52 on the inner side (the left side in FIG. 4) of the corresponding terminal 56b along the above-described imaginary straight line, which is generally parallel to the plane of each circuit board surface 53, 63.

Here, for illustrative purpose, a reference direction (a predetermined direction) D is defined as a direction, which is generally parallel to the circuit board surfaces 53, 63 along the imaginary straight line and extends from the first end 57, 67 side to the second end 58, 68 side, as shown in FIG. 4. Each of the two terminals 56a at the first end 57 side of the first circuit board 52 is arranged after the corresponding one of the two terminals 66a at the first end 67 side of the second circuit board 62 in the reference direction D. Also, each of the four terminals 56b at the second end 58 side of the first circuit board 52 is arranged after the corresponding one of the four terminals 66b at the second end 68 side of the second circuit board 62 in the reference direction D. The positional sequence of the terminals 56a, 66a of the circuit boards 52, 62 in the reference direction D at the first end 57, 67 side is the same as the positional sequence of the terminals 56b, 66b of the circuit boards 52, 62 in the reference direction D at the second end 58, 68 side. Furthermore, in the present embodiment, upon the bending of the terminals 56a, 56b, 66a, 66b, each of the terminals 56a, 56b of the first circuit board 52 is welded with the corresponding one of the terminals 66a, 66b of the second circuit board 62 along the perpendicular direction, which is generally perpendicular to the plane of each circuit board surface 53, 63, i.e., which is generally perpendicular to the reference direction D. More specifically, with reference to FIGS. 7A and 7B, a contact surface 56ax of each terminal 56a extending in the perpendicular direction at the first end 57 side of the first circuit board 52 is welded with a contact surface 66ax of the corresponding terminal 66a extending in the perpendicular direction at the first end 67 side of the second circuit board 62 along the perpendicular direction. Here, the contact surface 56ax of the terminal 56a is located on an inner side of the corresponding terminal 66a where a center of the first circuit board 52 is located. Furthermore, a contact surface 56bx of each terminal 56b extending in the perpendicular direction at the second end 58 side of the first circuit board 52 is welded with a contact surface 66bx of the corresponding terminal 66b extending in the perpendicular direction at the second end 68 side of the second circuit board 62 along the perpendicular direction. Here, the contact surface 56bx of the terminal 56b is located on an outer side of the terminal 66b that is opposite from the center of the first circuit board 52.

Now, a manufacturing method of the motor driver 20 will be described. First, there are provided the first and second circuit boards 52, 62, into which the terminals 56a, 56b, 66a, 66b are partially embedded and to which the electrical circuit components 50, 60 are installed. Next, the circuit board main body 64 of the second circuit board 62 is placed over the support wall 55 of the first circuit board 52, so that the circuit board main body 64 of the second circuit board 62 is supported by the support wall 55 of the first circuit board 52, and each terminal 66a, 66b of the second circuit board 62 is placed in its corresponding position, which corresponds with the corresponding terminal 56a, 56b of the first circuit board 52. Thereafter, the terminals 66a at the first end 67 side of the second circuit board 62 are placed in contact with and are welded with the terminals 56a, respectively, at the first end 57 side of the first circuit board 52. Then, the terminals 66b at the second end 68 side of the second circuit board 62 are placed in contact with and are welded with the terminals 56b, respectively, at the second end 58 side of the first circuit board 52. Finally, the motor driver 20 is fixed in a predetermined position in the case member 16 to integrate with the electric motor 12.

Figure 7A:
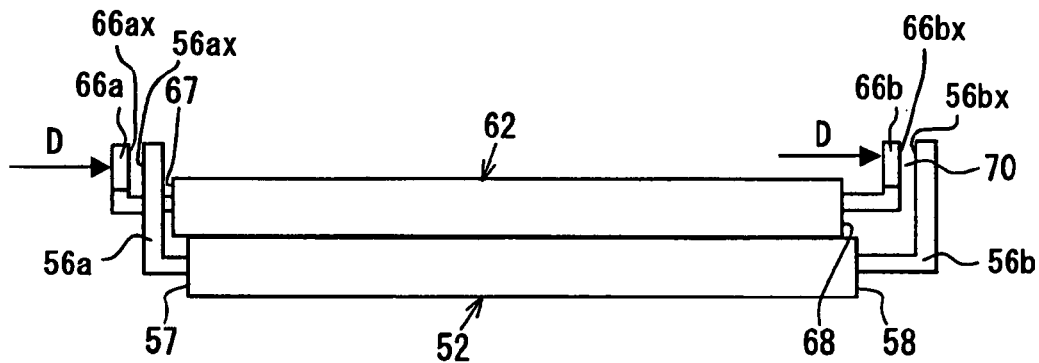
FIGS. 7A and 7B are schematic diagrams showing a manufacturing method of the motor driver of FIG. 4.
Figure 7B:
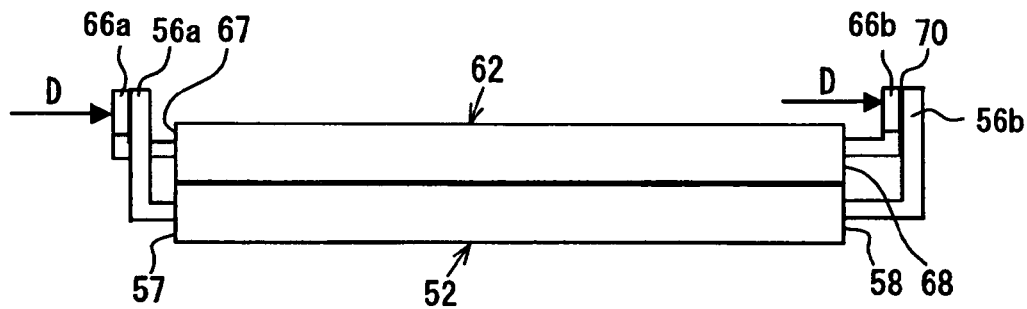

At the time of performing the above welding, as shown in FIGS. 7A, 7B, when the terminals 66a at the first end 67 side of the second circuit board 62 are moved toward the terminals 56a at the first end 57 side of the first circuit board 52 in the reference direction D, the terminals 66b at the second end 68 side of the second circuit board 62 are also moved toward the terminals 56b at the second end 58 side of the first circuit board 52. Therefore, even when each terminal 56a at the first end 57 side of the first circuit board 52 contacts with the corresponding terminal 66a at the first end 67 side of the second circuit board 62, a gap 70, which would be generated due to a manufacturing tolerance, is reduced or minimized between each terminal 56b at the second end 58 side of the first circuit board 52 and the corresponding terminal 66b at the second end 68 side of the second circuit board 62, as shown in FIGS. 7A, 7B. Thus, after each terminal 56a at the first end 57 side of the first circuit board 52 is welded with the corresponding terminal 66a at the first end 67 side of the second circuit board 62, each terminal 56b at the second end 58 side of the first circuit board 52 can be brought into contact with the corresponding terminal 66b at the second end 68 side of the second circuit board 62 to weld therebetween with minimum deformation of the terminal 56 at the second end 58 side of the first circuit board 52 and minimum deformation of the terminal 66b at the second end 68 side of the second circuit board 68. Therefore, an initial deformation will be less likely generated in the terminals 56b at the second end 58 side of the first circuit board 52 and in the terminals 66b at the second end 68 side of the second circuit board 62, so that it is possible to effectively limit ripping-off, i.e., separation of the welded joint between each terminal 56b at the second end 58 of the first circuit board 52 and the corresponding terminal 66b at the second end 68 side of the second circuit board 62 even after long time use.

Furthermore, each circuit board 52, 62 is received in the case member 16, so that an available space is limited in the direction, which is generally parallel to the plane of each circuit board 53, 63, at the outer side of each circuit board 52, 62. However, in the present embodiment, the terminals 56a, 56b, 66a, 66b are welded together along the perpendicular direction, which is generally perpendicular to the plane of each circuit board surface 53, 63, so that a sufficient welding surface area can be implemented in each terminal 56a, 56b, 66a, 66b. Therefore, in the present embodiment where the initial deformation of each terminal 56a, 56b, 66a, 66b is less likely to occur, a relatively high welding strength can be maintained for long time.

Furthermore, the first and second circuit boards 52, 62 are arranged one after another in the direction that is generally perpendicular to the plane of each circuit board surface 53, 63, so that an available installation space for installing the electrical circuit elements 50, 60 can be increased while allowing the installation of the motor driver 20 in the limited space at the engine.

Therefore, through use of the motor driver 20, the high durability of the motor driver 20 is implemented by limiting the ripping-off of the welded terminals 56a, 56b, 66a, 66b, and at the same time the high installability of the motor driver 20 to the engine is implemented. Thus, the motor driver 20 of the present embodiment is suitable for the valve timing adjusting apparatus 10.

The present invention is not limited to the above embodiment, and the above embodiment may be modified in various ways without departing from the scope and spirit of the present invention.

For example, the number of the terminals 56a at the first end 57 side of the first circuit board 52, the number of the terminals 66a at the first end 67 side of the second circuit board 62, the number of the terminals 56b at the second end 58 side of the first circuit board 52 and the number of the terminals 66b at the second end 68 side of the second circuit board 62 are not limited to the above described ones and may be changed according to a corresponding specification.

Furthermore, the welding procedure of the terminals 56a, 56b, 66a, 66b of the circuit boards 52, 62 is not limited to the above one and may be changed in various any other ways. Specifically, before the contacting and welding of the terminals 66a at the first end 67 side of the second circuit board 62 to the terminals 56a, respectively, at the first end 57 side of the first circuit board 52, the terminals 66b at the second end 68 side of the second circuit board 62 may be placed in contact with and may be welded with the terminals 56b, respectively, at the second end 58 side of the first circuit board 52. Also, simultaneously with the contacting and welding of the terminals 66a at the first end 67 side of the second circuit board 62 to the terminals 56a, respectively, at the first end 57 side of the first circuit board 52, the terminals 66b at the second end 68 side of the second circuit board 62 may be placed in contact with and may be welded with the terminals 56b, respectively, at the second end 58 side of the first circuit board 52.

Furthermore, the positional relationship between each of the terminals 56a of the first circuit board 52 and the corresponding one of the terminals 66a of the second circuit board 62 may be reversed. In such a case, each of the terminals 56a at the first end 57 side of the first circuit board 52 may be welded to the corresponding one of the terminals 66a at the first end 67 side of the second circuit board 62 from the outer side, and each of the terminals 56b at the second end 58 side of the first circuit board 52 may be welded to the corresponding one of the terminals 66b at the second end 68 of the second circuit board 62 from the inner side. Therefore, in this case, the circuit board 62 corresponds to the first circuit board of the present invention, and the circuit board 52 corresponds to the second circuit board of the present invention.

Furthermore, the positional relationship (the upper and lower positional relationship in FIGS. 7A and 7B) between the first circuit board 52 and the second circuit board 62 in the direction that is generally perpendicular to the plane of each circuit board 52, 62 may be reversed. Also, the bending direction of the terminals 56a, 56b, 66a, 66b may be reversed with respect to that of the above embodiment.

In addition, the way of connecting between the corresponding adjacent terminals 56a, 56b, 66a, 66b is not limited to the above described welding. Specifically, the corresponding adjacent terminals 56a, 56b, 66a, 66b may be connected together by at least one of the welding, soldering and staking (including a combination of any one of the welding, the soldering and the staking).

Furthermore, the above mechanism 30 may be replaced with any other appropriate phase change mechanism, in which the valve timing is adjustable by changing a relative phase between the crankshaft and the camshaft through use of rotation of the electric motor.

Additional advantages and modifications will readily occur to those skilled in the art. The invention in its broader terms is therefore not limited to the specific details, representative apparatus, and illustrative examples shown and described.

What is claimed is:

1. A motor driver for a valve timing adjusting apparatus of an internal combustion engine, which has an electric motor to adjust valve timing of at least one of an intake air valve and an exhaust valve of the engine, the motor driver comprising first and second circuit boards that drive the electric motor by supplying a drive electric current to the electric motor, wherein:

the first and second circuit boards are arranged one after another in a specific direction that is generally perpendicular to a plane of the first circuit board and a plane of the second circuit board;

the first circuit board includes a first side terminal and a second side terminal, which are spaced from each other in a predetermined direction that is generally parallel with the plane of the first circuit board and the plane of the second circuit board;

the second circuit board includes a first side terminal and a second side terminal, which are separated from each other in the predetermined direction and which are connected to the first side terminal and the second side terminal, respectively, of the first circuit board;

the first side terminal of the first circuit board is arranged after the first side terminal of the second circuit board in the predetermined direction; and the second side terminal of the first circuit board is arranged after the second side terminal of the second circuit board in the predetermined direction.

2. The motor driver according to claim 1, wherein:

a contact surface of the first side terminal of the first circuit board, which contacts a contact surface of the first side terminal of the second circuit board, is located on an inner side of the first side terminal of the second circuit board where a center of the first circuit board is located; and a contact surface of the second side terminal of the first circuit board, which contacts a contact surface of the second side terminal of the second circuit board, is located on an outer side of the second side terminal of the second circuit board that is opposite from the center of the first circuit board.

3. The motor driver according to claim 1, wherein:

a contact surface of the first side terminal of the first circuit board and a contact surface of the first side terminal of the second circuit board contact with each other and extend in the specific direction that is generally perpendicular to the plane of the first circuit board and the plane of the second circuit board; and a contact surface of the second side terminal of the first circuit board and a contact surface of the second side terminal of the second circuit board contact with each other and extend in the specific direction that is generally perpendicular to the plane of the first circuit board and the plane of the second circuit board.

4. The motor driver according to claim 1, wherein:

a contact surface of the first side terminal of the first circuit board is connected to a contact surface of the first side terminal of the second circuit board by at least one of welding, soldering and staking; and a contact surface of the second side terminal of the first circuit board is connected to a contact surface of the second side terminal of the second circuit board by at least one of welding, soldering and staking.

* * * * *